(12) United States Patent
Poulus

(10) Patent No.: US 8,679,612 B2
(45) Date of Patent: Mar. 25, 2014

(54) CRAFT FABRIC

(75) Inventor: Joost Poulus, East Bentleigh (AU)

(73) Assignee: Moose Enterprises (Aust) Pty Ltd., Victoria (AU)

( * ) Notice: Subject to any disclaimer, the term of this patent is extended or adjusted under 35 U.S.C. 154(b) by 560 days.

(21) Appl. No.: 12/742,497

(22) PCT Filed: Nov. 14, 2008

(86) PCT No.: PCT/AU2008/001698
§ 371 (c)(1),
(2), (4) Date: Oct. 18, 2010

(87) PCT Pub. No.: WO2009/062257
PCT Pub. Date: May 22, 2009

(65) Prior Publication Data
US 2011/0020586 A1  Jan. 27, 2011

(30) Foreign Application Priority Data

Nov. 16, 2007  (AU) ................................. 2007906296

(51) Int. Cl.
*C09J 7/04* (2006.01)
*B32B 27/04* (2006.01)
*B32B 7/12* (2006.01)

(52) U.S. Cl.
USPC .................................. 428/76; 428/68; 442/151

(58) Field of Classification Search
USPC ........................................ 428/76, 68; 442/151
See application file for complete search history.

(56) References Cited

U.S. PATENT DOCUMENTS

| | | | |
|---|---|---|---|
| 2,830,003 A | 4/1958 | Mason | |
| 3,387,061 A | 6/1968 | Smith et al. | |
| 4,844,973 A | 7/1989 | Konishi et al. | |
| 5,722,319 A | 3/1998 | Hirano | |
| 6,509,074 B1 * | 1/2003 | Wyman | 428/40.1 |
| 2007/0084843 A1 | 4/2007 | Caldwell | |

* cited by examiner

*Primary Examiner* — Brent O'Hern
(74) *Attorney, Agent, or Firm* — The Webb Law Firm

(57) ABSTRACT

A fabric material for use in craft activities, the fabric material comprising a textile substrate and a pressure sensitive adhesive carried by opposite surfaces of the substrate, whereby upon the application of pressure to one piece of the fabric material against another piece of the fabric material causes the adhesion of the pieces of fabric.

12 Claims, 7 Drawing Sheets

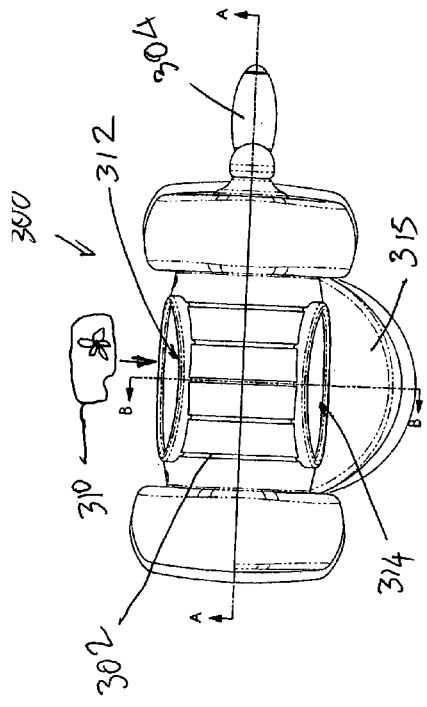
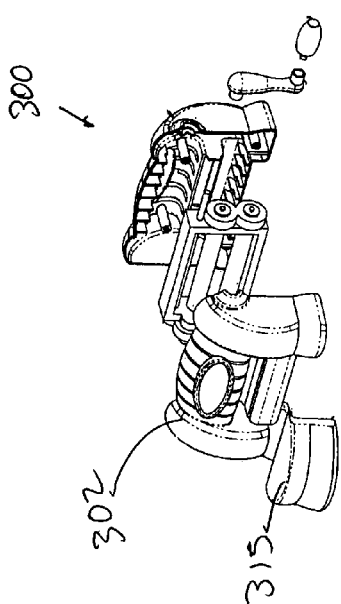
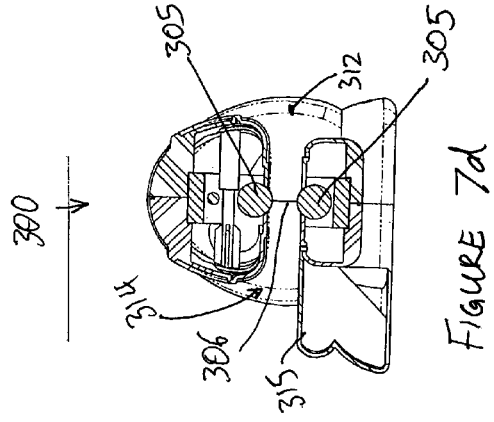
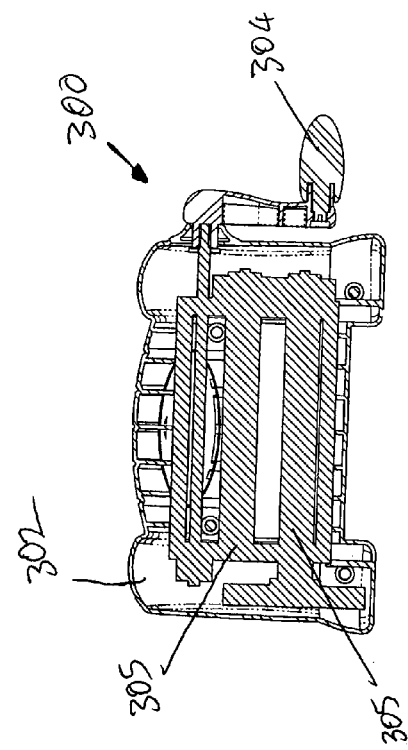

Craft Fabric

FIELD OF THE INVENTION

The present invention relates to craft fabric and also to a method of making a fabric toy using craft fabric.

BACKGROUND

The art of craft work takes the form of many different old and modern techniques using all manner of materials to allow users to express their creativity. A fundamental aspect of craft work is the connecting together of two or more parts, whether this is by way of sewing, fastening, gluing, clipping, locking, and the like.

It is desired with the present invention to provide users with an additional creative dimension in creating crafted objects.

SUMMARY OF THE INVENTION

The present invention provides a fabric material for use in craft activities, the fabric material comprising a textile substrate and a pressure sensitive adhesive carried by opposite surfaces of the substrate, whereby upon the application of pressure to one piece of the fabric material against another piece of the fabric material causes the adhesion of the pieces of fabric.

The present invention further provides a fabric material for use in craft activities, the fabric material comprising a textile substrate and a pressure sensitive adhesive infused through the substrate to opposite surfaces of the substrate, whereby upon the application of pressure to one piece of the fabric material against another piece of the fabric material causes the adhesion of the pieces of fabric.

Preferably, the textile substrate is an absorbant non-woven substrate.

In one embodiment, the pressure sensitive adhesive is carried as a distinct coating on both surfaces of the substrate. Alternatively, the pressure sensitive adhesive is impregnated in the substrate such that adhesive is present on at least one surface of the substrate.

The present invention also provides a fabric craft work comprising an assembly of individual pieces of a fabric material, the fabric material having a textile substrate carrying a pressure sensitive adhesive on both opposite surfaces of the substrate, wherein juxtaposed surfaces of the individual pieces of fabric material are adhered together by the application of pressure.

The fabric craft work may comprise a base of the fabric material upon which smaller individual pieces may be supported.

The fabric craft work may also include a filler that is encapsulated between individual pieces of the fabric material so as to create a filled, three dimensional toy.

Preferably, the filler includes any one or more of: inserts or particulate material in the form of beads, beans, semi-rigid inserts, or rigid inserts formed from foam, polystyrene or other filling material.

The present invention also provides a method of constructing a fabric craft work by:

overlaying pieces of a fabric material made of a textile substrate carrying a pressure sensitive adhesive on both opposite surfaces of the substrate, applying pressure to the overlaid pieces to adhere the pieces of fabric material one to another to form the fabric craft work.

The method may also include arranging a filler between individual pieces of the fabric material, and encapsulating the filler between the individual pieces of fabric material by adhering the individual pieces of fabric material around the filler.

The present invention also provides a pressure application device for use in assembling a fabric craft work as claimed in claim 8, comprising a body that supports two opposing elongate rotational members that form a nip through which a partially assembled fabric craft work can be passed, whereby the rotational members apply pressure to the fabric craft work to enable the pressure sensitive adhesive in individual pieces of the fabric craft work to adhere the individual pieces one to another.

Preferably, the device further comprises a winding handle that can be operated to drive one of the rotational members.

Preferably, the two rotational members are elongate rollers. Alternatively, one of the rotational members is an endless belt that extends around two support rollers, and the other rotational member is an independent roller. Accordingly, the nip is located between the independent roller and one of the support rollers.

Preferably, the separation of the nip is adjustable.

Also preferably provided with the pressure application device is a plate assembly between which a partially constructed fabric craft work is placed and then together with the plate assembly is passed through the pressure application device, the plate assembly including parallel plates joined by a flexible hinge.

Thus, pressure can be applied to the fabric toy to enable the pressure sensitive adhesive in individual pieces of the fabric toy to adhere the individual pieces one to another.

BRIEF DESCRIPTION OF THE DRAWINGS

In order that the invention may be more easily understood, embodiments will now be described, by way of example only, with reference to the accompanying drawings, in which:

FIG. 7a: is an exploded front perspective view of a first embodiment of a pressure application device in accordance with the present invention;

FIG. 7b: is a plan view of the pressure application device of FIG. 7a;

FIG. 7c: is a front sectional view of the device taken at section A-A of FIG. 7b;

FIG. 7d: is a side sectional view of the device taken at section B-B of FIG. 7b;

DETAILED DESCRIPTION

FIGS. 1, 2a to 2c and 3 show a fabric toy 10 in accordance with a first embodiment of the present invention, and more specifically a fabric toy formed from a selection of individual pieces that are pressed together to form a singular fabric toy. The individual pieces are made of a fabric material having a textile substrate upon which is carried a pressure sensitive adhesive, whereby by way of the pressure sensitive material the individual pieces adhere to one another when pressure is applied to juxtaposed, or adjacent lying, pieces.

The term 'toy' is not intended to be confined to children's toys, but encompasses other craft activities including the making of art and crafts, decorations and other objects having the sophistication pursued by adults.

The fabric toy 10 is made of an assembly that includes two fabric layers 12, 14 shaped from sheets of fabric material, which is formed in accordance with an embodiment of the present invention. The assembly also includes: a filler 16, which is arranged between the two fabric layers 12, 14; and two fabric patches 18, 20, which are also shaped from fabric material in accordance with an embodiment the present invention. The filler 16 can be made of, for example, foam or polystyrene.

The fabric toy 10 can be described as a "plush toy" because the filler 16 is soft, which gives a soft, squeezable feel. Furthermore, the filler 16 is encapsulated between the fabric layers 12, 14, which creates a filled, three dimensional toy.

Figure 4A:
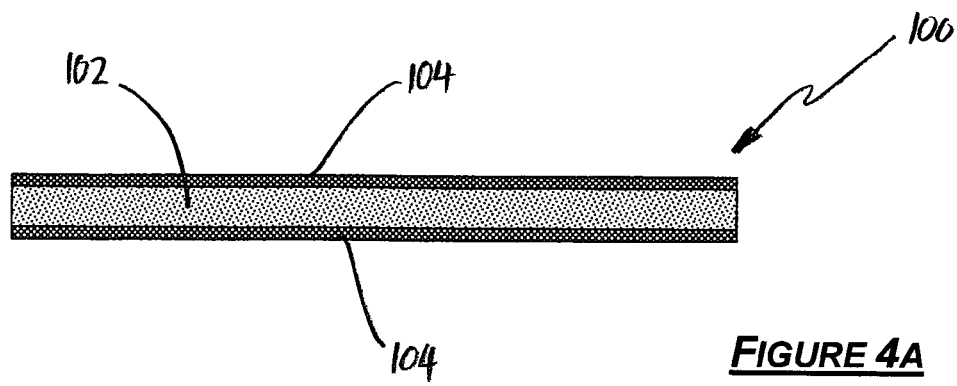
FIG. 4a: is an enlarged side view of a first embodiment of a fabric material in accordance with the present invention.
Figure 4B:
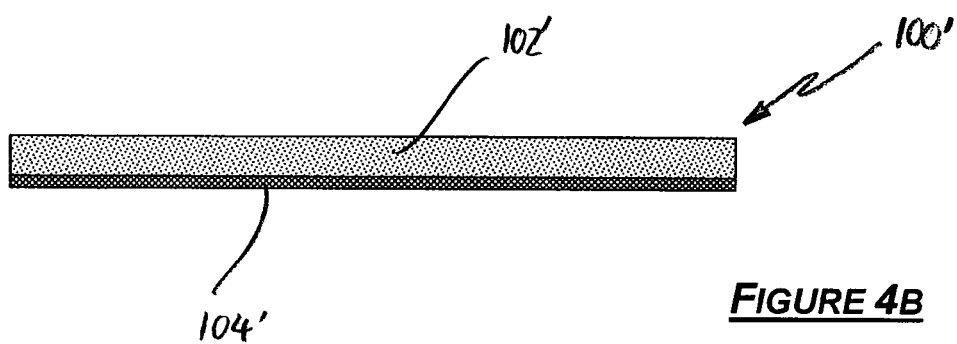
FIG. 4b: is an enlarged side view of a second embodiment of a fabric material in accordance with the present invention.
Figure 5:
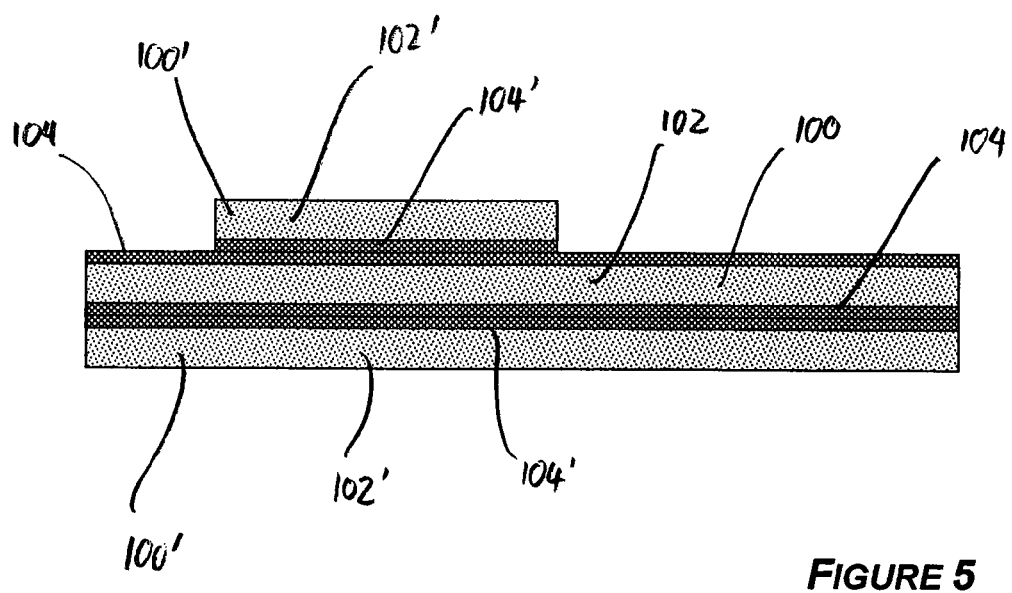
FIG. 5: is an enlarged side view of three pieces of the fabric material shown in FIGS. 4a and 4b that have been joined together.

Two embodiments of the fabric material, which can be used for the fabric layers 12, 14 and the fabric patches 18, 20, are shown in further detail in FIGS. 4a, 4b and 5. In the embodiment shown in FIGS. 4a, 4b and 5, the fabric materials 100, 100' both have a substrate 102, 102' formed of a fibre (or filament) based textile. The fibres (not shown) are non-woven; that is, the fibres are interlocked by mechanical, thermal and/or chemical processes to form a flat, flexible substrate 102, 102' of web-like construction. The fibres can be formed from one or more synthetic fibres, such as a blend of polypropylene, and polyester (e.g. polyethylene terephthelate). The substrate can be made from polyester, acrylic materials or from natural fibres such as felt.

In the preferred embodiment the textile substrates are a spunlace non-woven fabric having a composition of 80% Rayon/Viscose and 20% polyester. The fabric is between 0.2 mm and 1.0 mm in thickness and in one embodiment is approximately 0.4 mm thick.

The textile substrate, regardless of what textile is used, is absorbent so as to be able to soak the adhesive into the substrate so that the exterior surfaces of the substrate remain tacky. The amount of adhesive absorbed by the substrate is kept to the minimum amount required to enable fabric pieces to stick together and to offset this amount against the desire to maintain the soft feel, flexibility and other characteristics of the textile substrate forming the base for the craft fabric.

The substrate 102, 102' is flexible such that it can be moulded around, over or inside a solid structure. Thus, the fabric material 100, 100' can be used with solid structures to form a solid body with an outer layer of fabric material. Accordingly, other pieces of fabric material can be adhered to the fabric material of the solid body.

Pressure sensitive adhesive is carried by the substrate 102, 102'. In these embodiments, the pressure sensitive adhesive is in the form of coatings 104, 104' that are carried on surfaces of the respective substrates 102, 102'. The fabric materials 100, 100' differ in that the pressure sensitive adhesive 104 of the fabric material 100 is applied to both surfaces of the substrate 102. In contrast, the pressure sensitive adhesive 104' is applied to only one surface of the substrate 102'.

In the embodiment where pressure sensitive adhesive is present on both surfaces of the substrate, the resulting craft fabric adheres quite well to another piece of the same craft fabric because the adhesive present on both surfaces promotes better adhesion than fabrics where only one surface is coated with pressure sensitive adhesive.

The process of applying pressure sensitive adhesive to the surfaces of the substrate involves use of a roller machine through which textile substrate is fed to roll adhesive onto one or both sides of the substrate at a temperature of between 40° C. to 70° C., and preferably 50° C. to 60° C. As the adhesive is applied a thin plastic backing from polyethylene sheet is laminated on one or both sides of the fabric to protect the adhesive before use.

In an alternative embodiment the pressure sensitive material is absorbed by the textile substrate so as to be impregnated within the substrate to some extent, rather than be coated on the substrate. The pressure sensitive adhesive may be partly absorbed into the substrate surface so to provide tackiness at the surface, or it may be absorbed through the whole substrate to both surfaces.

In adhesive another application process the textile substrate is passed through a reservoir of pressure sensitive adhesive in fluid form so that the adhesive soaks through the substrate. Depending on the absorbency of the fabric and the viscosity of the adhesive, the amount of absorbency by the substrate can be more readily controlled with the rolling/coating method of applying adhesive discussed above.

When pieces of fabric material 100, 100' are brought into contact (such that one piece of fabric material 100, 100' at least partially overlays another piece of fabric material 100, 100'), the pressure sensitive adhesive enables the juxtaposed surfaces of pieces of fabric material 100, 100' to stick to one another on application of pressure. Despite having adhesive qualities the fabric material 100, 100' maintains its original characteristics, namely it still behaves as a piece of fabric.

The degree of adhesion may be selected such that, prior to application of pressure, pieces of fabric material that make up the fabric toy can be readily separated. This may be achieved by varying the composition of the pressure sensitive adhesive, such that light pressure establishes a low level of adhesion. Thus, the person constructing the fabric toy can readily adjust the relative position of the fabric toy pieces prior to application of pressure. In addition, the degree of adhesion may be such that, subsequent to the application of pressure, the adhesion of the pieces of fabric material is sufficiently strong that the pieces making up the fabric toy cannot readily be prised apart. This may be achieved by appropriate selection of the composition of the pressure sensitive adhesive.

In some embodiments, the pressure sensitive adhesive 104, 104' selected for use in the fabric material 100, 100' requires a relatively low level of pressure to obtain the desired level of adhesion, for example, the level of pressure that can be generated by a child's hand. However, in some alternative embodiments, the pressure sensitive adhesive 104, 104' selected for use in the fabric material 100, 100' requires a higher level of pressure to obtain the desired level of adhesion, such as through the use of mechanical loading.

The pressure sensitive adhesive may contain organic or inorganic groups. Examples of adhesives with organic groups include rubber-based, styrene-based, acrylic-based, or urethane-based adhesives. Examples of adhesives with inorganic groups include silicone-based adhesives. One example of a silicone-based adhesive is a silicone resin solution, such as 2013 Solventless PSA produced by Dow Corning®. Further, the pressure sensitive adhesive may contain one or more additional additives to alter adhesion. Some examples include primers, solvents or catalysts.

In one embodiment the pressure sensitive adhesive is natural rubber latex (NRL) which is applied to the surface of a substrate at an elevated temperature (of 50° C. to 60° C.) by coating the substrate surface with a roller. The substrate then absorbs the adhesive so that the adhesive infiltrates and penetrates through the substrate. The resulting fabric has tacky surfaces on both sides which remain tacky even through repeated use.

In some embodiments, subsequent to the application of pressure, the resulting degree of adhesion of the pieces of fabric material allows the pieces making up the fabric toy to be prised apart, although with some resistance. As such, the selected pressure sensitive adhesive may retain adhesive properties, which enables the respective pieces of fabric material to be reused. Alternatively, the pieces of fabric material may be permanently or strongly adhered together.

Figure 1:
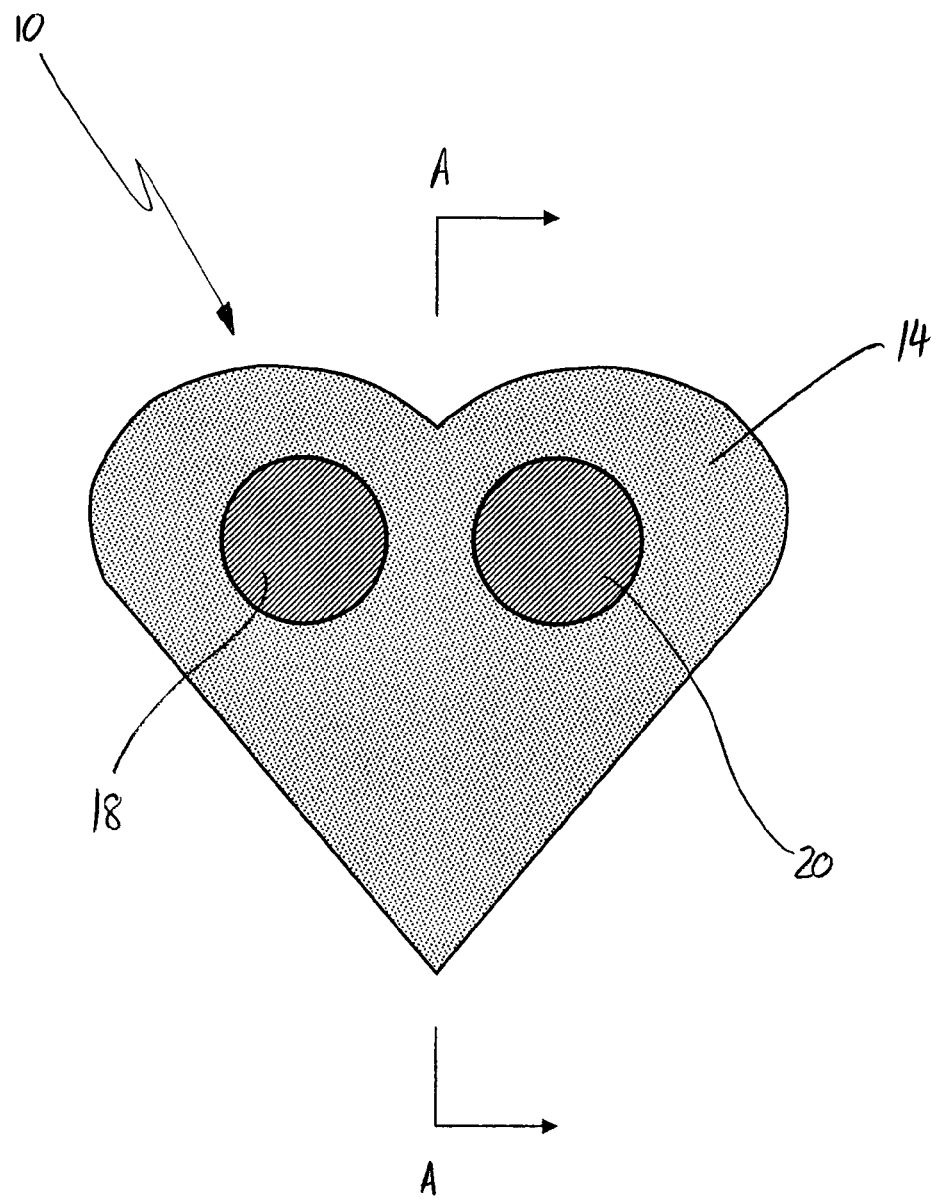
FIG. 1: is a plan view of a fabric toy according to a first embodiment of the present invention.
Figure 3:
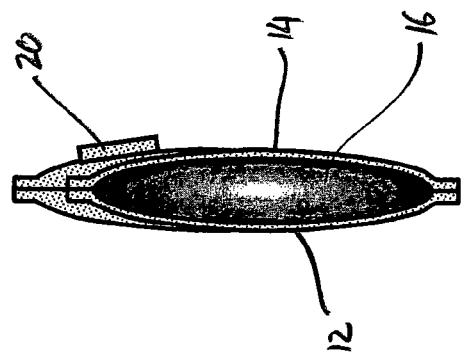
FIG. 3: is a cross section view of the partially assembled fabric toy of FIG. 1, as viewed along the line A-A in FIG. 1.

The fabric layers 12, 14 and fabric patches 18, 20 shown in FIGS. 1 to 3 are die-cut from sheets of the fabric material to form the desired shapes. Similarly, the filler 16 is also die-cut.

In alternative embodiments, the individual pieces of fabric material may be cut manually from flat sheets of the fabric material using scissors or other cutting tools. For example, a cutting machine could be provided along with bulk sheets of un-cut printed fabric which the user can then cut to their own desired shapes using the cutting machine. This provides an additional dimension to the craft process of making a fabric toy and allows freeform play with further scope for creativity.

Figure 2C:
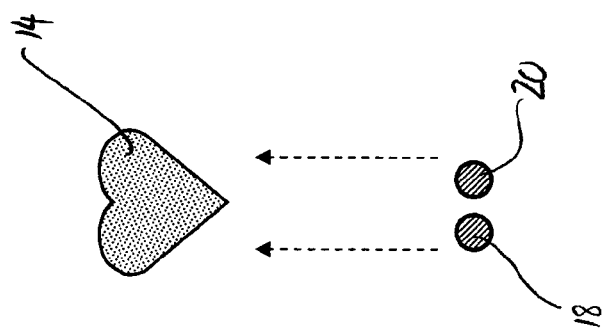
FIGS. 2a to 2c: illustrate the steps in plan view of constructing the fabric toy of FIG. 1.
Figure 2B:
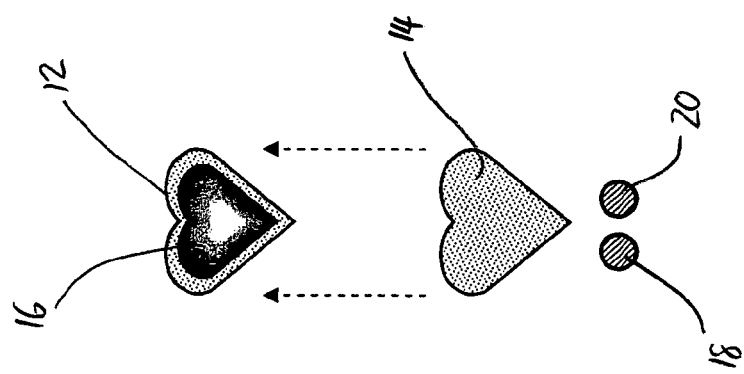
Figure 2A:
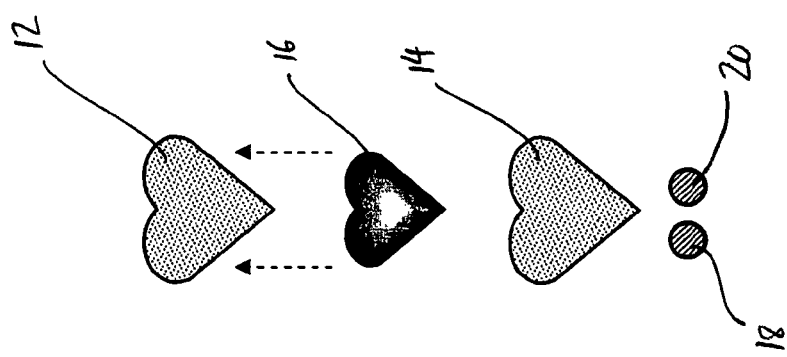

FIGS. 2a to 2c illustrate a method according to an embodiment of the present invention, which can be used to construct the fabric toy 10.

The filler 16 is arranged centrally on the first fabric layer 12. The second fabric layer 14 is overlaid over both the filler 16 and the first fabric layer 12. As shown in the figures, the fabric layers 12, 14 are identical in size and shape. The filler 16 is identical in shape to the fabric layers 12, 14, but has a smaller size in plan view, when compared with fabric layers 12, 14. Accordingly, peripheral surfaces of the fabric layers 12, 14 are juxtaposed and are in contact.

Application of pressure to the overlaying fabric layers 12, 14 causes the pressure sensitive adhesive of the fabric layers 12, 14 to adhere the fabric layers 12, 14 one to the other. By virtue of the resulting adhesion between layers 12, 14 about their peripheral edges, the filler 16 is encapsulated between the layers 12, 14. FIG. 3 illustrates the encapsulation of the filler 16 between the fabric layers 12, 14.

Patches 18, 20, also coated or impregnated with pressure sensitive adhesive, are positioned on the second fabric layer 14. Application of pressure on the patches 18, 20 causes the pressure sensitive adhesive of the patches 18, 20 and/or the second fabric layer 14 to adhere the patches 18, 20 to the second fabric layer 14. Thus, the fabric toy 10 is constructed.

Figure 6:
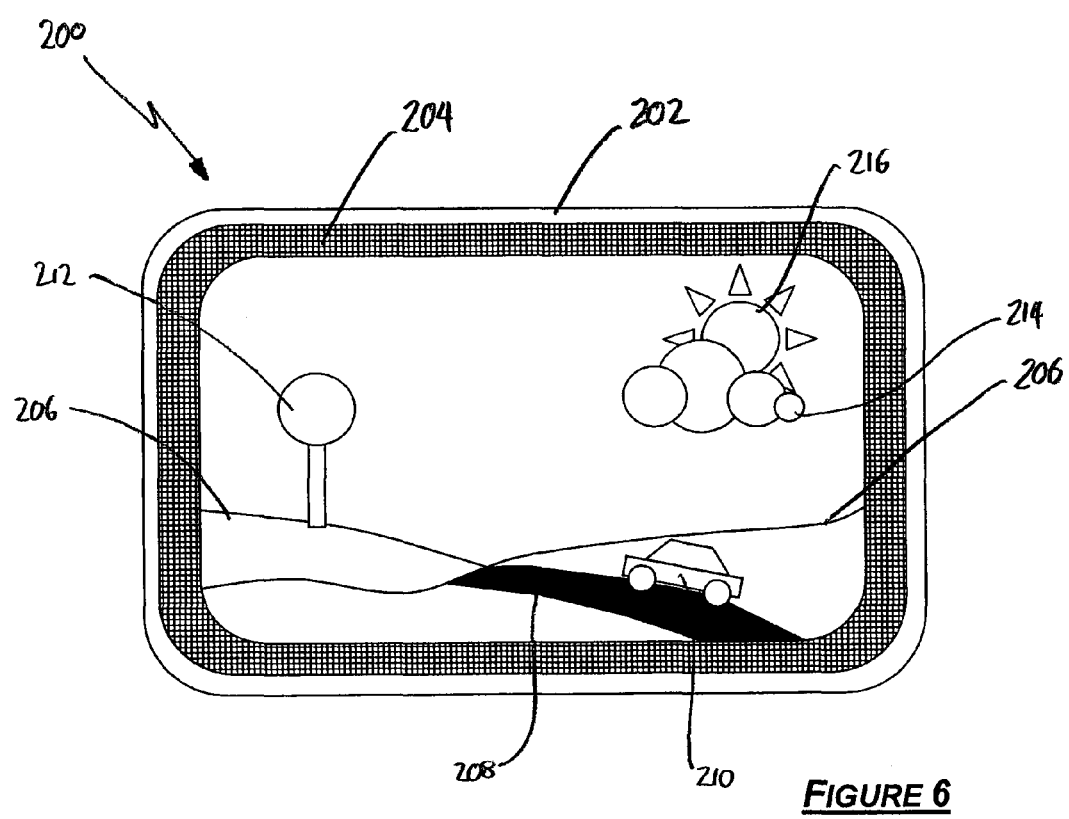
FIG. 6: is a plan view of a second embodiment of a fabric toy in accordance with the present invention.

FIG. 6 shows in plan view a second embodiment of a fabric toy 200, which differs from the first fabric toy 10 in that fabric toy 200 comprises separate components of fabric material laid decoratively one on top of the other and/or beside each other to create a 'scene' without necessarily the use of filler materials.

The fabric toy 200 is made of an assembly that consists of a base layer 202 of above described fabric material and shaped fabric pieces 204-216. The shaped pieces are also formed of the above described fabric material containing pressure sensitive adhesive, and are overlaid onto the base layer 202 and assembled to form a collage thereby creating a scene, in this embodiment, or otherwise simply creating art. Accordingly, the base layer 202 supports some of the shaped pieces 204, 206, 212, 216, while other shaped pieces 208, 210, 214 are placed at least partially on top of the first shaped pieces 204, 206, 212, 216.

In the embodiment shown in FIG. 6, the fabric toy 200 forms a collage that is a country scene. The shaped pieces 204-216 are individually shaped to form the following elements of the scene: a frame 204, foreground and background horizons 206, a road 208, a car 210, a tree 212, a cloud 214 and a sun 216.

It will be appreciated that the shape of the fabric toy 200, and in particular the shape and configuration of the base layer 202 and the shaped pieces 204, are inessential and can take any desired form to form any themed collage or scene.

Once the selected shaped pieces 204-216 have been positioned on the base layer 202, pressure is applied to compress the fabric toy 200 so as to adhere the shaped pieces 204-216 and the base layer 202 to one another.

The fabric toy 200 can be progressively constructed, modified or added to subsequent to pressing the initial collage. This can be achieved by overlaying further shaped pieces to the already created and pressed fabric toy 200, and pressing the further shaped pieces thereby adding further components to the collage.

If desired, the fabric toy 200 could be used as a base to construct other fabric toys. For example, the fabric toy 200 could be used to construct a cushion (not shown) by encapsulating a stuffing material between the base layer 202 and another layer of the fabric material. Alternatively, the fabric toy 200 could be used as a backdrop for a diorama, or be incorporated as designs/decoration with other objects such as purses, greeting cards, book covers, key rings, photo frames, clothes and many other objects.

The fabric toy 200 is intended to be provided as a selection of separate components parts. The creator can then construct the fabric toy, according to set instructions or using their own creativity, by overlaying individual components and applying pressure in order to unify the separate components into a single fabric toy 200.

FIGS. 7a to 7d show a pressure application device 300 in accordance with a first embodiment, which is used for mechanically applying pressure across a fabric toy. The device 300 has a body 302 that houses two opposing elongate rotational members 305 that form a nip 306 through which a partially assembled fabric toy 310 can be passed. The device 300 includes a winding handle 304 that drives one, or both, of the rotational members 305, which are rollers. The rotational members are arranged such that the fabric toy 310 is compressed as it passes through the nip 306, thus applying pressure to activate the pressure sensitive adhesive of the pieces of fabric material. Thus, the device 300 can be used to apply the requisite pressure to construct a fabric toy in accordance with embodiments of the present invention.

A partially constructed fabric toy 310 is placed through an entry 312 on one side of the housing body 302 into contact with the rollers and fed through the nip by winding handle 304. The pressure exerted by the rollers on opposite sides of the fabric toy 310 compresses the adhesive in one fabric material component to the adhesive or substrate of another fabric material component. The compressed fabric toy 310 exits the device 300 from an exit 314, which is in line with and on an opposite side of the housing body 302 to the entry 312, and comes to rest on a tray 315.

The device 300 could also include an adjustment mechanism for adjusting the separation of the nip to control the level of pressure that can be applied by the device 300 to achieve different levels of adhesion strength, and also to accommodate different thicknesses of fabric toys.

Figure 8A:
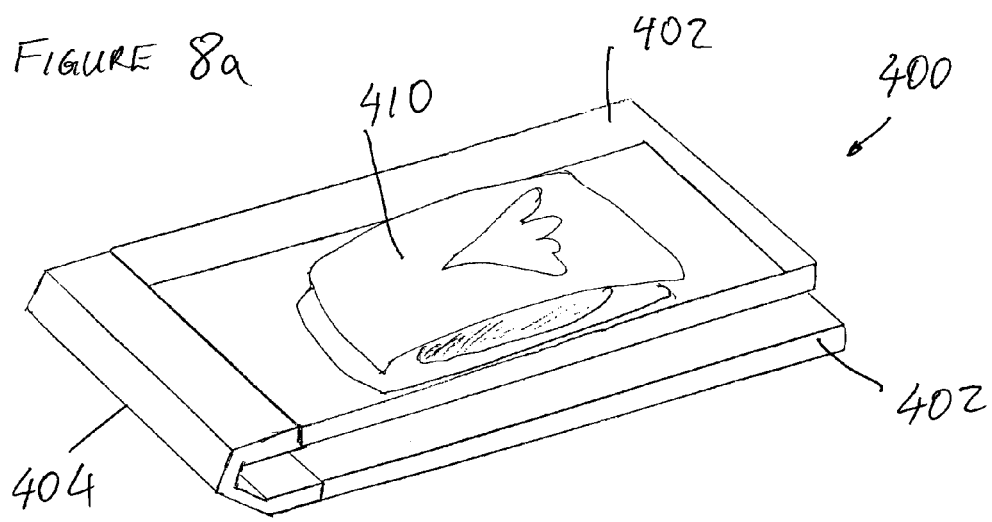
FIG. 8a: is a perspective view of a press plate assembly for use with the first embodiment of the pressure application device.
Figure 8B:
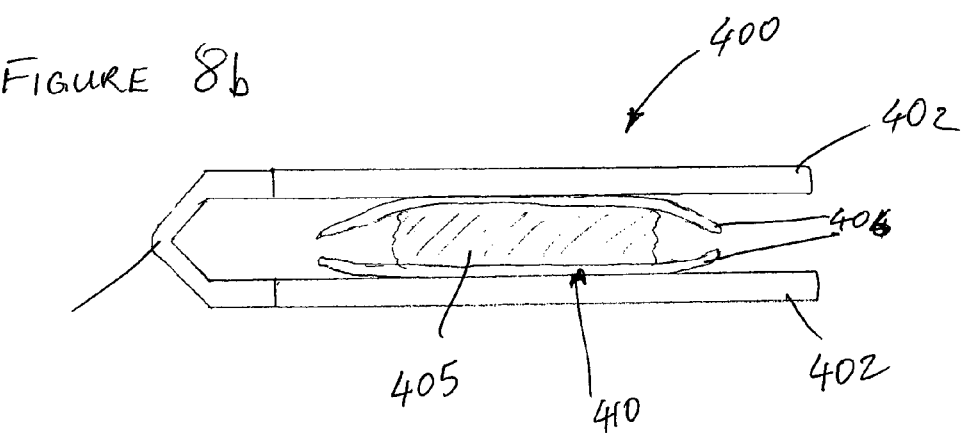
FIG. 8b: is a side view of the press plate assembly in an uncompressed position.
Figure 8C:
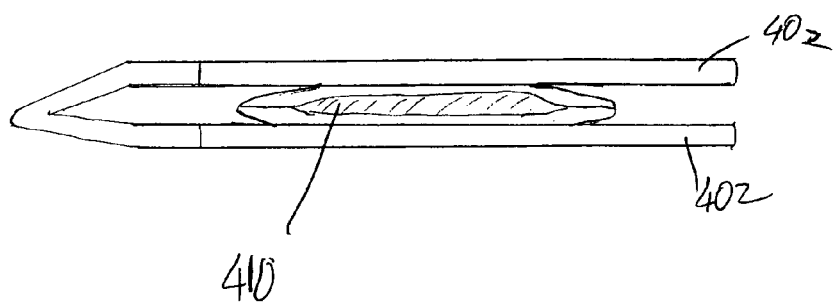
FIG. 8c: is a side view of the pressure plates in a compressed position.

FIGS. 8a to 8c show a press plate assembly 400 to be used with the pressure application device 300 to ensure even distribution of pressure across the whole fabric toy 410. The assembly 400 comprises two opposing press plates 402, which in the version illustrated are made of glass or transparent plastics, between which a fabric toy 410 is placed. The plates 402 are hinged together by a flexible member that while allows the plates to move relative to one another, maintains plate alignment. The flexible member is specifically a folded rubber panel hinge 404 to which one edge of each plate 402 is attached.

Press plate assembly 400 with fabric toy 410 held therein is placed through entry 312 of pressure application device 300 and is rolled through the device to the exit 314 using handle 304. As the plate assembly 400 passes through nip 306, the rollers 305 compress the plates and hence the fabric toy. The rigid plates ensure that the pressure applied by the rollers is evenly distributed across the fabric toy 410 to achieve a good adhesion across all fabric components used in creating fabric toy 410.

FIG. 8b illustrates a fabric toy 410 placed between press plates 402 before compression. Upper and lower layers 406 of fabric material are separated by a filler 405. FIG. 8c illustrates the device 400 after compression so that the upper and lower layers 406 of fabric are pressed together at their edges to stick together and enclose between them filler 405.

Figure 9:
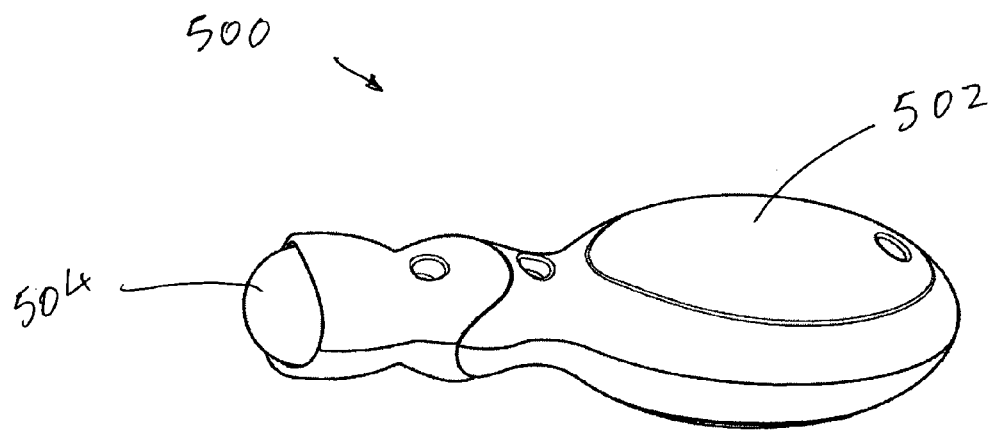
FIG. 9: is a perspective view of a second embodiment of a pressure application device in accordance with the present invention.
Figure 10:
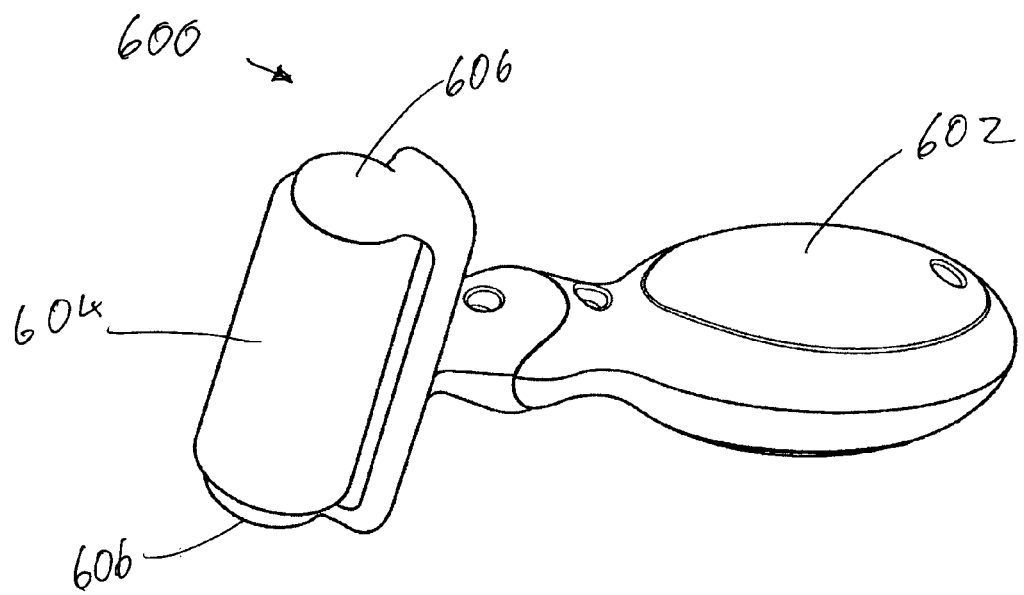
FIG. 10: is a perspective view of a third embodiment of a pressure application device in accordance with the present invention.

FIGS. 9 and 10 illustrate third and fourth embodiments respectively of pressure application devices and specifically hand held tools 500 and 600 respectively that can apply local pressure to a part of a fabric toy.

The hand tool 500 illustrated in FIG. 9 comprises a handle 502 and a roller ball 504 mounted at one end of the tool. A user rolls roller ball 504 over the toy fabric to press on adjacent layers of fabric and cause the layers to stick together. The roller ball allows the tool to apply continuous pressure as the tool is moved over the fabric. The handle 502 is hollow and may include a storage compartment (not shown) for embellishments such as stickers, beads, plastic eyes, and the like.

The hand tool 600 illustrated in FIG. 10 is similar to the tool 500 in that it has a handle 602 and a working end. At the working end of tool 600 is a cylindrical roller 604 adapted to apply pressure over a fabric surface as a user guides the hand tool 600 over the surface. The ends 606 of the roller 604 are rounded so that a user can use the ends 606 to apply a more local pressure point, if required, to affix together fabric material in creating the fabric toy. The handle 602 in this embodiment may also include a storage compartment accessible through a cover in which small items may be stored.

The present invention provides an enormous degree of flexibility, which provides creators with freedom to construct many types of fabric toys without the use of needle and thread or the application of glue.

The substrate of the fabric material according to embodiments of the present invention may be treated to alter the appearance of the substrate. For example, the substrate may be silk screen printed or roller printed to provide patterns or indicia on one or both surfaces. Designs, such as patterns or indicia may be heat transferred onto the fabric. The substrate may be dyed to provide materials of varied colours. For example, the substrate may be dyed with any of visible colour pigments, fluorescent pigments, phosphorescent pigments, thermochromic pigments, glow in the dark pigments or a combination of these pigments.

Alternatively or additionally, the substrate may include glitter particles, mica particles, and/or metallic threads. Furthermore, embellishments may be added to the exterior of the fabric toy by adhering the embellishment directly to the fabric layer carrying pressure sensitive adhesive or by adhering a separate fabric layer to the underside of the embellishment and adhering that separate layer to the exterior fabric layer of the toy. Such embellishments could include, plastic eyes, tufts of hair, diamantes and other decorations made of plastics, metal, wood and materials other than the fabric used for the fabric toy. Further, the substrate may be formed to include scent entrained in the substrate.

It will be appreciated that fabric material according to the present invention can be adhered to other materials. For example, in some toys fabric material could be adhered to sheets or members made of plastic or cellulose (eg. cardboard sheets). These products may have pressure sensitive adhesive applied to the external surfaces to which the fabric material is to be applied. Thus, the creator may use fabric material of the present invention to craft functional or decorative objects, such as bowls, trinket boxes, etc.

The substrate may be formed to have any of the following properties: absorbent, liquid repellent, resilient, stretchable, soft, resistant to tearing, flame retardant and/or washable.

The substrate can be generally flat, or have flat surfaces. Alternatively, the substrate may have a contoured profile, such as corrugated. The surfaces of the substrate may be embossed/debossed to produce a textured surface.

While the substrate described herein is a non-woven substrate, it is understood that woven substrates may be used in forming the fabric material. Examples of woven substrates include calico and gauze.

The pressure sensitive adhesive can initially be in liquid form prior to being applied to the substrate. Accordingly, the adhesive can be absorbed into the substrate to impregnate the substrate. Thus, the adhesive can be applied on one surface of the substrate but in the finished fabric material is present on both surfaces.

Alternatively, the pressure sensitive adhesive can initially have low viscosity such that when the adhesive is applied to the substrate, it is carried as a distinct coating on a surface of the substrate.

The fabric toy 10 according to the embodiment shown in FIGS. 1, 2a to 2c and 3 includes a filler 16, generally of solid foam or polystyrene, but the filler 16 could instead comprise foam or polystyrene stuffing in particulate or 'free' form, or other particulate material such as beads, beans, grains, semi-rigid inserts, or rigid inserts.

In another embodiment the fabric toy may include other inserts between fabric layers to give the toy additional characteristics. For example, pliable wire could be laid between fabric layers to give the toy structure and to enable it to bend and stay bent. Other inserts may include a magnet for attaching the toy to a metal surface, or in a more sophisticated version, a sound chip/speaker or other electronic circuitry that create a sound, illumination or a response to a master control.

The fabric toy may be created for attachment to other objects. Aside from the magnet insert described above, a hook or looped piece of fabric or similar could be inserted between the fabric layers so that a loop protrudes from the fabric toy which can be hooked on to another object such as a keychain, or to which objects can be tied.

Once the fabric toy is completely assembled and accessorized it is possible to group the assembly as a more permanent or stronger piece of work and to prevent the fabric layers from pulling apart. This may be achieved by spraying the entire piece with a spray adhesive or a lacquer that forms a protective coating on the exterior surface. The exterior coating protects the piece and improves the life of the fabric toy.

To adapt the assembled fabric toy for different applications various machines and add-on accessories may be employed so that users can display their fabric creations in a number of different ways. For example, a sticker making machine could be used to apply a sticker/adhesive backing onto the finished fabric creation so that the creation can be stuck onto another object such as books, bags, walls, and the like.

The type, shape, colour, and number of separate components used to make up a fabric toy will differ for differently themed fabric toys.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

The invention claimed is:

1. A fabric material for use in craft activities, the fabric material having a printed textile substrate having a printed design, pattern, or indicia and a pressure sensitive adhesive carried by opposite surfaces of the substrate, whereby the application of pressure to one piece of the fabric material against another piece of the fabric material causes the adhesion of the pieces of fabric.

2. The fabric material claimed in claim 1, wherein the textile substrate is an absorbent non-woven fabric.

3. The fabric material claimed in claim 2, wherein the fabric is a rayon/viscose, polyester blend, or wherein the fabric is felt.

4. The fabric material claimed in claim 1, wherein the pressure sensitive adhesive is coated on both sides of the substrate.

5. The fabric material claimed in claim 1, wherein the substrate is passed through a reservoir of liquid pressure sensitive adhesive.

6. The fabric material claimed in claim 1, wherein the pressure sensitive adhesive comprises natural rubber latex.

7. A fabric material for use in craft activities, the fabric material having a printed textile substrate having a printed design, pattern, or indicia and a pressure sensitive adhesive infused through the substrate to opposite surfaces of the substrate, whereby the application of pressure to one piece of the fabric material against another piece of the fabric material causes the adhesion of the pieces of fabric.

8. The fabric material claimed in claim 7, wherein the textile substrate is an absorbent non-woven fabric.

9. The fabric material claimed in claim 8, wherein the fabric is a rayon/viscose, polyester blend, or wherein the fabric is felt.

10. The fabric material claimed in claim 7, wherein the pressure sensitive adhesive is coated on both sides of the substrate.

11. The fabric material claimed in claim 7, wherein the substrate is passed through a reservoir of liquid pressure sensitive adhesive.

12. The fabric material claimed in claim 7, wherein the pressure sensitive adhesive comprises natural rubber latex.

* * * * *

UNITED STATES PATENT AND TRADEMARK OFFICE
CERTIFICATE OF CORRECTION

PATENT NO. : 8,679,612 B2  
APPLICATION NO. : 12/742497  
DATED : March 25, 2014  
INVENTOR(S) : Joost Poulus Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Twenty-ninth Day of September, 2015

Michelle K. Lee
*Director of the United States Patent and Trademark Office*